United States Patent [19]
Hamada

[11] Patent Number: 5,223,928
[45] Date of Patent: Jun. 29, 1993

[54] TELEVISION RECEIVER

[75] Inventor: Masanori Hamada, Kadoma, Japan

[73] Assignee: Matsushita Electric Industrial Co., Ltd., Osaka, Japan

[21] Appl. No.: 892,650

[22] Filed: Jun. 2, 1992

Related U.S. Application Data

[63] Continuation of Ser. No. 459,833, Jan. 26, 1990, abandoned.

[30] Foreign Application Priority Data

Jun. 14, 1988 [JP]  Japan .................. 63-146431

[51] Int. Cl.⁵ .................. H04N 7/01; H04N 11/20
[52] U.S. Cl. .................. 358/140; 358/11; 358/160
[58] Field of Search .................. 358/140, 11, 160

[56] References Cited

U.S. PATENT DOCUMENTS 4,605,962 8/1986 Christopher .................. 358/140

FOREIGN PATENT DOCUMENTS

| | | |
|---|---|---|
| 53-51922 | 11/1978 | Japan . |
| 58-54783 | 3/1983 | Japan . |
| 59-122286 | 7/1984 | Japan . |
| 61-55386 | 3/1986 | Japan . |
| 61-206380 | 9/1986 | Japan . |
| 61-267469 | 11/1986 | Japan . |
| 62-213389 | 9/1987 | Japan .................. 358/140 |
| 63-26174 | 2/1988 | Japan . |

Primary Examiner—Howard W. Britton
Attorney, Agent, or Firm—Stevens, Davis, Miller & Mosher

[57] ABSTRACT

A television receiver is disclosed in which an NTSC signal having an aspect ratio of 4:3 is received and supplied to an NTSC decoder to demodulate the R, G, B signal and a sync signal to be applied to a time-base conversion circuit for conversion into non-interlace scanning and aspect-ratio conversion under the control of clock signals generated by a first clock generator for writing and a second clock generator for reading. The second clock generator for reading has the number of clock signals set to an even number per one scanning line for reading to display on a television receiver having an aspect ratio of 5:3.

10 Claims, 3 Drawing Sheets

TELEVISION RECEIVER

This application is a continuation of application Ser. No. 07/459,833, filed Jan. 26, 1990 (abandoned).

FIELD OF THE INVENTION

The present invention relates to a TV receiver for receiving television signals having different aspect ratios such as high-definition (so-called "high vision") broadcasting and the conventional broadcasting (NTSC) signals, and more particularly to a TV receiver for displaying an NTSC signal on a high-definition TV receiver.

BACKGROUND ART

With demand rising for a TV image of higher and higher quality, an IDTV has recently been developed as a part of the conventional NTSC system intended to remove cross colors, dot interference, line flicker and the like by digital signal processing using a memory on the one hand, while a high-definition TV system having twice as many scanning lines as the NTSC system has been conceived on the other hand. These two systems, however, have different methods of display in terms of aspect ratio, that is, 4:3 for the NTSC and 5:3 for the high-definition system. It is, therefore, necessary to convert the aspect ratio if a TV receiver is to receive television signals of different systems mentioned above.

A conventional TV receiver is disclosed, for example, in JP-A-61-55386 (published application number 62-213389(A)). FIG. 2 shows a configuration of this conventional TV receiver, in which a TV signal of NTSC system (aspect ratio of 4:3) is subjected to an image quality improving process (conversion into non-interlace scanning, i.e., into progressive scanning) and an image is displayed on a high-definition TV receiver (aspect ratio of 5:3). In FIG. 2, reference numeral 11 designates an NTSC signal input terminal of aspect ratio of 4:3, numerals 12, 13 high-definition TV signal input terminals of an aspect ratio of 5:3, numeral 14 an NTSC decoder for demodulating the NTSC signal and producing R, G and B signals together with a sync signal, numeral 15 a non-interlace processing circuit for converting the demodulated R, G, B signals for non-interlace scanning, numeral 16 an RGB switching circuit for switching the signal converted for non-interlace scanning to a high definition TV signal and supplying it to the CRT, numeral 17 a definition switching circuit for switching the sync signal and supplying the same to the CRT, and numeral 18 the CRT having an aspect ratio of 5:3 adapted for displaying both the NTSC signal of aspect ratio of 4:3 and the high-definition TV signal of aspect ratio of 5:3.

The operation of a TV receiver configured as described above will be explained with reference to a display screen having an aspect ratio of 5:3 shown in FIG. 4. In FIG. 2, when an NTSC signal is supplied to the input terminal 11, the NTSC decoder 14 demodulates R, G, B signals and a sync signal and supplies the same signals to the non-interlace processing circuit 15.

The non-interlace processing circuit 15 includes a plurality of line memories for time-base conversion along the horizontal direction and sync signal processing for conversion into non-interlace scanning. The time-base conversion is for compressing the time-base by one half along the horizontal direction in order display on a CRT having an aspect ratio of 4:3 in such a manner that if the signal processing clock of the NTSC decoder is 4 fsc (four times the subcarrier frequency), for instance, the data is written in a line memory with a clock signal of 4 fsc and read out with a clock signal of 8 fsc.

In the case of displaying on a CRT having an aspect ratio of 5:3, on the other hand, the horizontal signal time-base is required to be compressed taking into consideration the time-base compression by one half for non-interface scanning and the difference in aspect ratio. This operation will be explained with reference to the non-interlace processing circuit 15 shown in FIG. 3.

In FIG. 3, numerals 150, 151 designate line memories for the time-base conversion, numeral 152 a write clock signal generator for the line memories 150, 151, numeral 153 a read clock signal generator, and numerals 154, 155 read and write switches respectively switchable in state every horizontal period in such a way that when the write switch is switched to one of the line memories 150 and 151, the read switch 155 is switched to the other thereof.

In the above-mentioned configuration, an R signal, for example, supplied from the NTSC decoder 4 is supplied to the line memory 151 through the write switch 154 of the non-interlace processing circuit 15. The R signal for a given horizontal period, for example, is written in a line memory in response to a write clock signal (a clock signal of 4 fsc, if the clock frequency for signal processing of the NTSC decoder is 4 fsc) produced from the write clock signal generator 152. In the case of writing in the line memory 151, the R signal for one horizontal period written in the preceding horizontal period is read from the line memory 152 twice in succession in response to a read clock signal (a clock signal of a clock frequency of 10 fsc ($=8$ fsc $\times 5/4$ in order for the conversion into non-interlace scanning and the different aspect ratio) generated from the read clock signal generator 152, and the signal thus read is applied to the RGB switching circuit 16 as a non-interlace signal through the read switch 15. The write and read clock signal generators 152, 153 are configured as a PLL circuit or the like and are controlled by a sync signal for the NTSC signal. The output signal which was converted for the non-interlace scanning and for the different aspect ratio by the non-interlace processing circuit 17 is displayed on the CRT 18 through the RGB switching circuit 16. The sync signal is compressed to be doubled regardless of the aspect ratio and is supplied through the deflection switching circuit 17 to the CRT 18.

In contrast, in the case of inputting a high-definition signal to the input terminal 12, high-definition R, G, B signals together with horizontal and vertical deflection signals are supplied through the RGB switching circuit 16 and the deflection switching circuit 17 to the CRT 18 for display thereon. FIG. 4 shows the display state, in which a video signal (signal obtained by subjecting an NTSC signal to the non-interlace conversion processing and the aspect-ratio conversion processing) having an aspect ratio of 4:3 is displayed on the CRT 18 having an aspect ratio of 5:3. Character A designates a residual non-display portion.

In the aforementioned configuration, however, the clock signal for processing of non-interlace scanning and aspect ratio conversion is 18 fsc, that is, the number of clocks per one horizontal period is an odd number ($227.5 \times 10 = 2275$). As a result, the number of clocks for the time-base compressed horizontal period is 2275/2, so that the processing circuit for non-interlace scanning conversion requires a delay of ½ clocks for each line, and is thus complicated.

SUMMARY OF THE INVENTION

In view of this problem, the object of the present invention is to provide a TV receiver having a simple processing circuit.

According to the present invention, there is provided a TV receiver comprising scanning conversion means for time-base conversion processing of a TV signal of interlace scanning type to display on a TV receiver having a different aspect ratio by non-interlace scanning. The conversion means comprises a time-base conversion circuit for converting a TV signal of an interlace scanning type into a signal for non-interlace scanning and a different aspect ratio, a first clock signal generator for generating a clock signal for controlling the writing operation of the time-base conversion circuit, and a second clock signal generator for generating a clock signal for controlling the reading operation, wherein the number of clocks for each scanning line produced from the second clock generator is set to an even number.

According to another aspect of the present invention, the aspect ratio and the line density of the TV signal of NTSC system are converted by a simple circuit configuration to display on a TV receiver of a high-definition system.

BEST MODE FOR CARRYING OUT THE INVENTION

Figure 1:
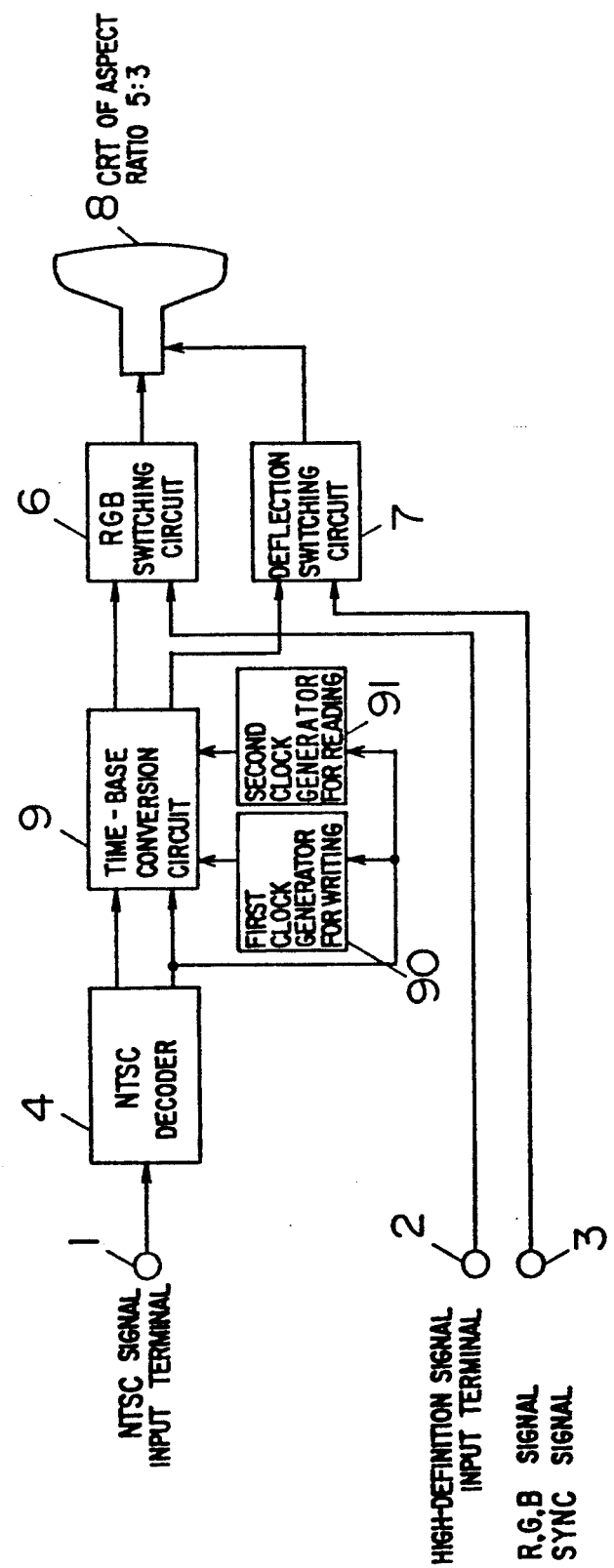
FIG. 1 is a diagram showing a configuration of a TV receiver according to an embodiment of the present invention.
Figure 2:
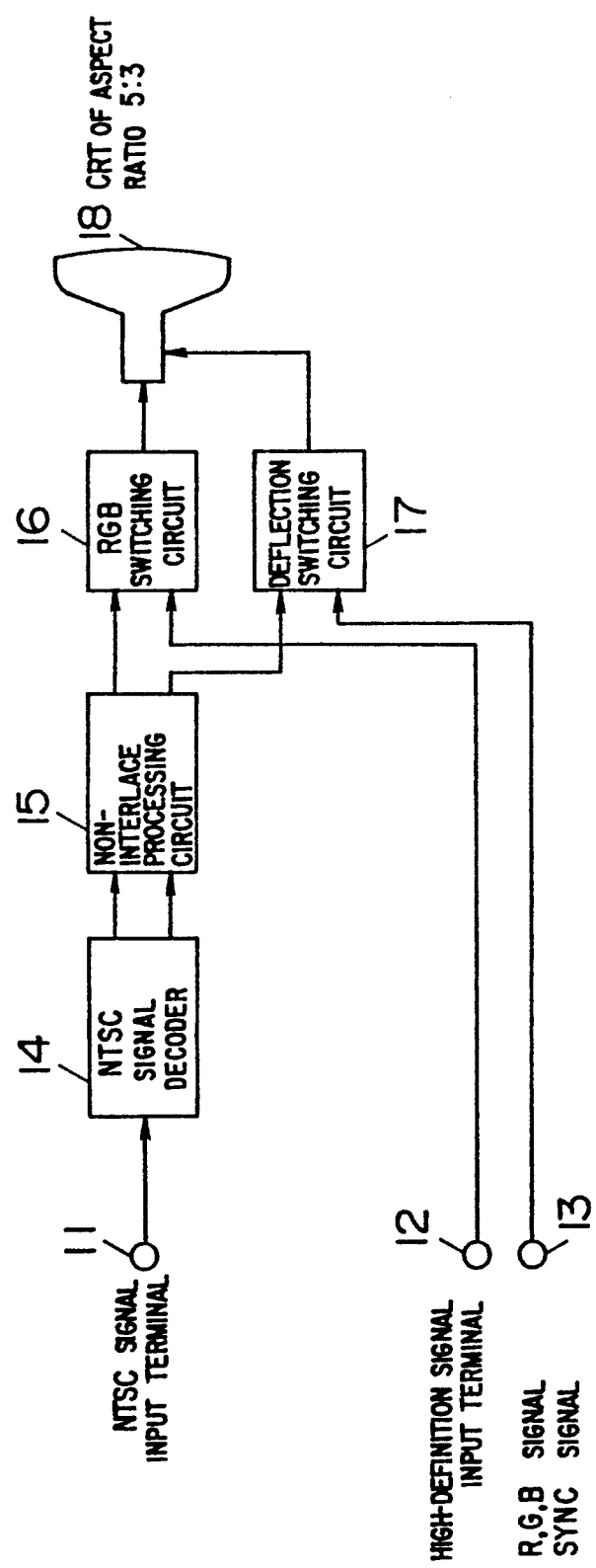
FIG. 2 is a diagram showing a configuration of a conventional TV receiver.
Figure 3:
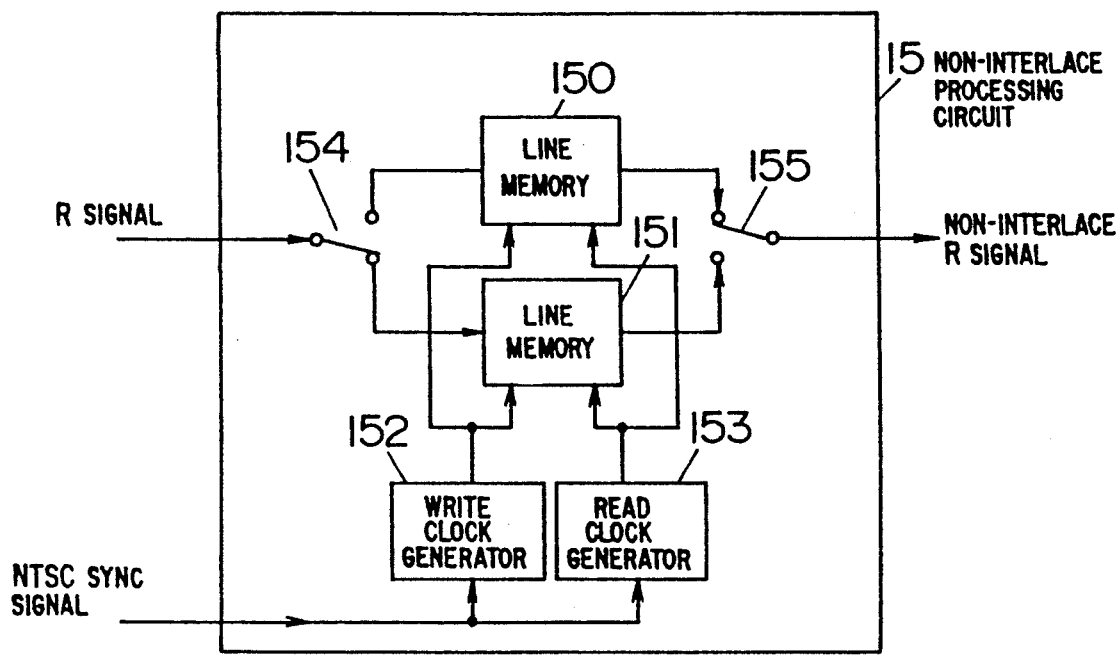
FIG. 3 is a diagram showing a configuration of a scanning conversion circuit for the aforementioned conventional TV receiver.
Figure 4:
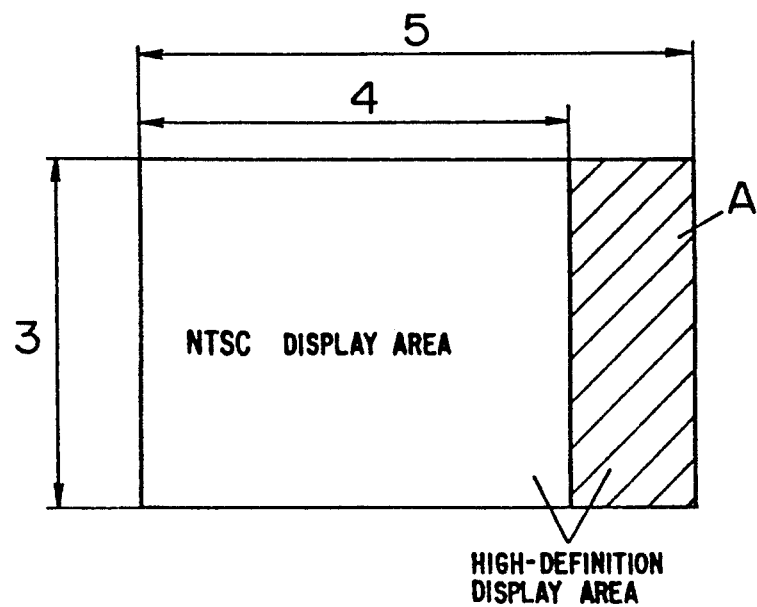
FIG. 4 is a diagram showing a display screen of a CRT having an aspect ratio of 5:3.

A configuration of a TV receiver according to an embodiment of the present invention is shown in FIG. 1. In FIG. 1, component parts identical to those included in the conventional circuit of FIG. 2 are designed by the same reference numerals as the corresponding ones in FIG. 2. Numeral 9 designates a time-base conversion circuit, numeral 90 a first clock generator for writing operation, and numeral 91 a second clock generator for reading operation.

Now, the operation of a TV receiver having the aforementioned configuration will be explained. Upon receipt of a TV signal having an aspect ratio of 5:3, the RGB switching circuit 6 and the deflection switching circuit 7 are switched in such a manner as to supply an input signal having an aspect ratio of 5:3 to the CRT 8 as in the conventional circuit, and the output thereof is displayed on the CRT 8.

Now, explanation will be made about the operation in a case where a TV signal having an aspect ratio of 4:3 is applied to the TV receiver. An R signal, for example, produced from the NTSC decoder is subjected to the processes of non-interlace scanning conversion and aspect ratio conversion at the time-base conversion circuit 9 including a line memory unit 92 or the like.

The writing operation into the line memory is controlled by a clock signal of the first clock generator 90 as in the conventional circuit configuration. The reading operation from the line memory, on the other hand, is controlled by a clock signal produced from the second clock generator. The second clock signal has a frequency determined taking into consideration both the aspect ratio and the non-interlace scanning conversion. Although the clock frequency of 10 fsc (=4 fsc×K×N), where K=2 and N=5/4, has been used conventionally, the second clock generator 91 according to the present invention is set to generate an even number of clocks near 10 fsc for each horizontal unit, for example, to generate 2274 or 2276 clocks instead of 2275. In this way, an even number of read clock signals are prepared to enable the reading with the same clock signals for each line in non-interlace conversion process.

In the aforementioned embodiment, the frequency of the second clock signal of the second clock signal generator is set to an even number for converting the aspect ratio. Instead, however, a clock frequency 2×n or 3×2n higher (n: Integer) may be used to keep the roundness of a circle displayed on the CRT within a satisfactory tolerance. Also, in place of the aspect ratio of 5:3 with reference to which the embodiment is explained above, the aspect ratio of 16:9 may be used for the same processing with equal effect. Further, the R, G, B signals which are used for explaining the conversion of the aspect ratio in the embodiment may of course be replaced by the luminance signal or chrominance signal with equal effect.

Furthermore, according to the present invention, a TV signal of the NTSC system is converted for non-interlace scanning to improved the image quality (by increasing the number of scanning lines), thus making it possible to view on the CRT with the same visual range or distance away therefrom as in the high-definition TV system. Also, the non-interlace scanning conversion for improving the image quality and the aspect ratio conversion are effected with the same line memory at the same time, thereby simplifying the circuit configuration. Also, in the case of aspect ratio conversion without regard to the non-interlace scanning conversion, the processing operation is effected by a simple processing circuit (such as a parallel processing circuit) using an even number of clock signals as in the present embodiment.

As explained above, according to the present invention, the number of read clock signals per scanning line is set to an even number, so that both the aspect ratio conversion and the non-interlace scanning conversion are effected with a simple processing circuit configuration.

INDUSTRIAL APPLICABILITY

It will be thus understood from the foregoing description that according to the present invention, the aspect ratio conversion and the non-interlace scanning conversion are effected with a simple processing circuit by setting the number of read clock signals to an even number per scanning line. More specifically, it is possible to view a TV picture, without any image dropout which otherwise might be caused due to the difference in aspect ratio, with an increased number of scanning lines of the NTSC signal only by adding a sample circuit to the existing high-definition TV receiver.

I claim:

1. A television receiver comprising:
   a non-interlace processing and time-base conversion circuit for converting an input television signal in an interlace scanning mode and having a first aspect ratio into a converted television signal in a non-interlace scanning mode and having a second aspect ratio different from said first aspect ratio, said conversion circuit including a line memory means,
   a first clock signal generator for generating a number w of write clock signals corresponding to each horizontal scanning period for writing said input television signal in the line memory means, and
   a second clock signal generator for generating read clock signals for reading said television signal stored in said line memory means, a number r of read clock signals generated from the second clock signal generator for each horizontal scanning period being an even number nearest to a clock number obtained by multiplying said number w of write clock signals by a factor K to achieve conversion from interlace scanning to non-interlace scanning and further multiplying by a factor N for conversion from said first aspect ratio to said second aspect ratio, whereby the input television signal is time-based converted to enable it to be displayed in a non-interlace scanning mode on a television receiver having said second aspect ratio.

2. A television receiver according to claim 1, wherein said factor K and said factor N are selected such that said clock number r of read clock signals generated by said second clock generator achieves a predetermined tolerance of roundness image for acceptable distortion of images displayed on the display screen thereby to effect the time-base conversion.

3. A television receiver according to claim 1, wherein said factor K is 2 and said factor N is 5/4 when the first aspect ratio is 4:3 and the second aspect ratio is 5:3.

4. A television receiver according to claim 1, wherein said factor K and said factor N are selected such that said clock number r of said read clock signals serves to suppress magnitudes of distortion, that is possible in displayed images, below a predetermined level.

5. A television receiver according to claim 1, wherein said even number of said read clock signals is given by 2n (n being an integer).

6. A television receiver according to claim 1, wherein said even number of said read clock signals is given by 3×2n (n being an integer).

7. A television receiver according to claim 1, wherein the input television signal of interlace scanning mode is of the NTSC system, said television receiver having an aspect ratio of the high-definition television system.

8. A television receiver according to claim 7, further comprising an RGB switching circuit and a deflection switching circuit for switching between said converted television signal output by said conversion circuit and another television signal from a high-definition television system for display on a CRT.

9. A television receiver according to claim 7, wherein said write clock signals generated by said first clock signal generator have a frequency of 4 fsc.

10. A method of converting an input television signal in an interlace scanning mode and having a first aspect ratio into a converted television signal in a non-interlace scanning mode and having a second aspect ratio different from said first aspect ratio, said method comprising:
   generating write clock signals having a first frequency for writing said input television signal in a line memory means,
   writing said input television signal in the line memory means,
   generating read clock signals having a second frequency which is greater than said first frequency, for reading said television signal stored in said line memory means, said second frequency being such that a number of said read clock signals generated for each horizontal scanning period is an even number, and
   reading said television signal from said line memory means in accordance with said second frequency, whereby the input television signal is time-based converted into said converted television signal for display in a non-interlace scanning mode on a television receiver having said second aspect ratio.

* * * * *